B. R. KOZLOWSKI.
TRAIN PIPE COUPLING MEMBER.
APPLICATION FILED APR. 11, 1907. RENEWED FEB. 20, 1908.
908,014.
Patented Dec. 29, 1908.
2 SHEETS—SHEET 2.
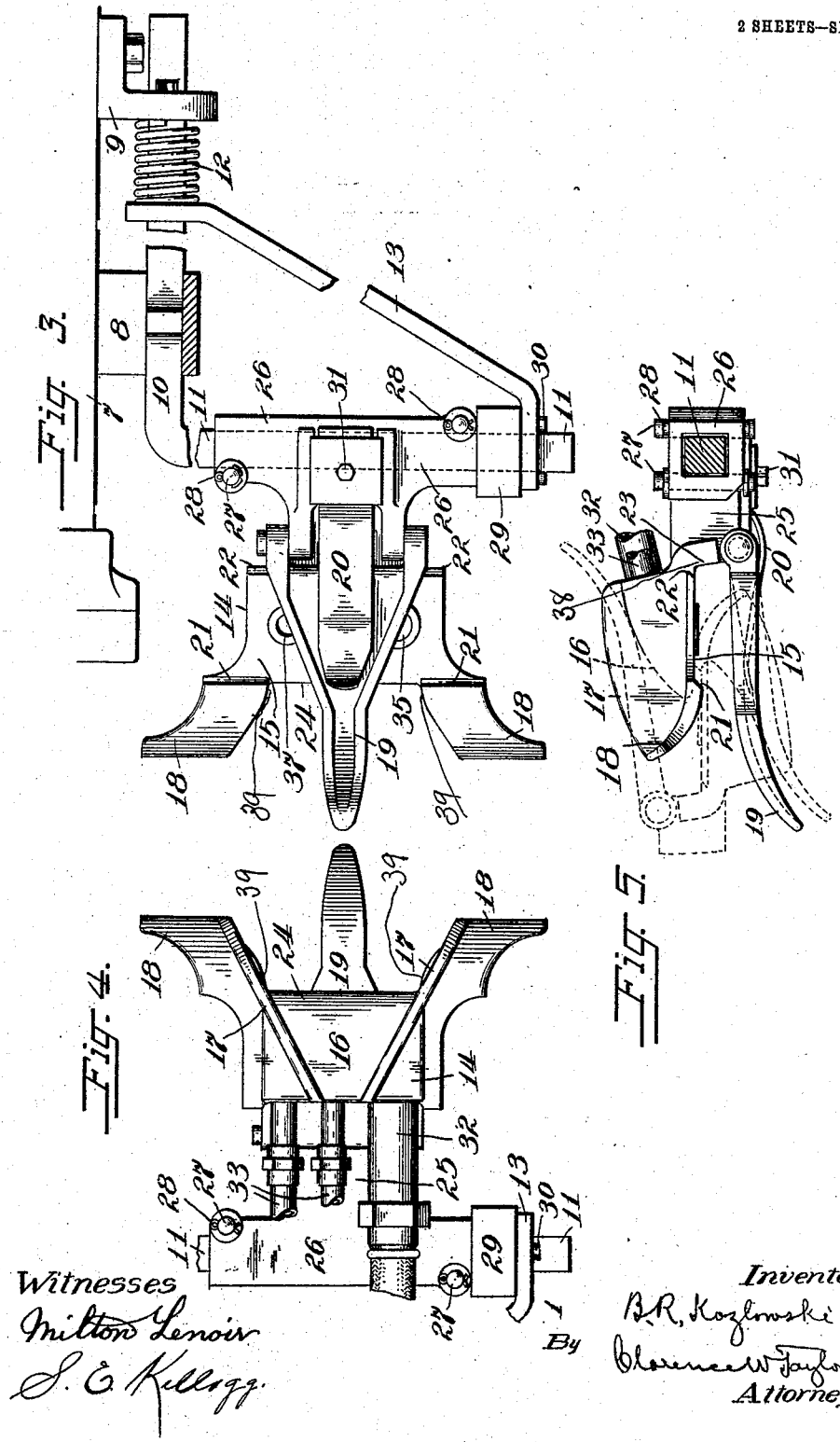
Witnesses
Milton Lenoir
S. E. Kellogg.
Inventor
B. R. Kozlowski
By
Clarence W. Taylor
Attorney.

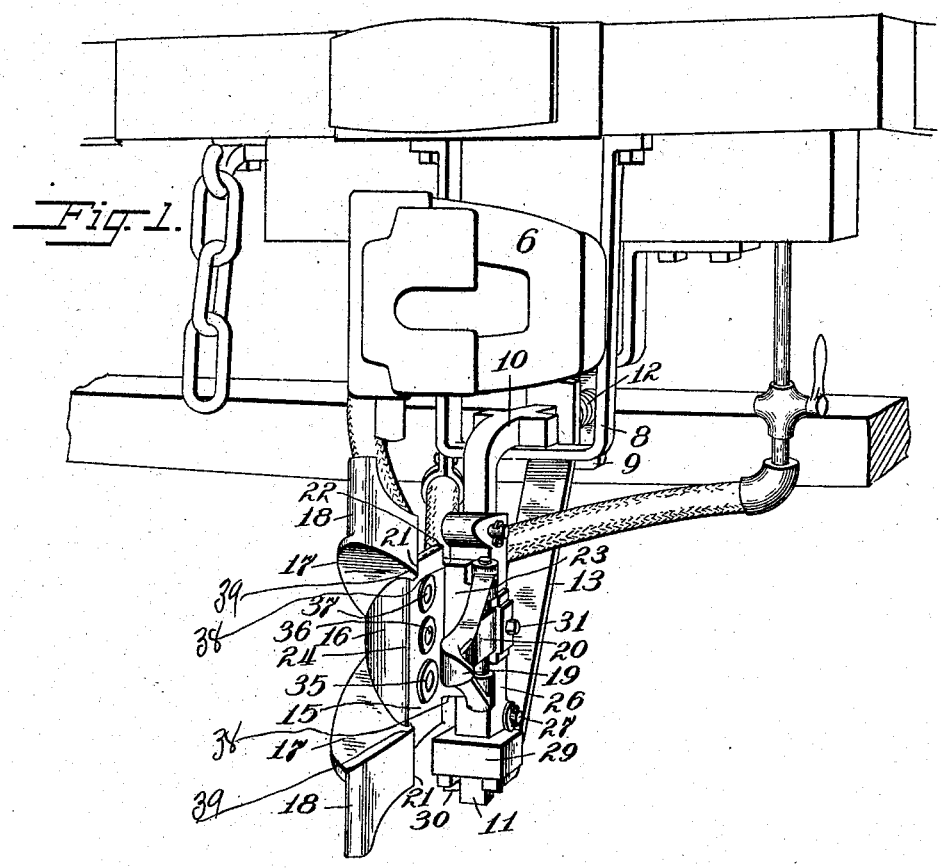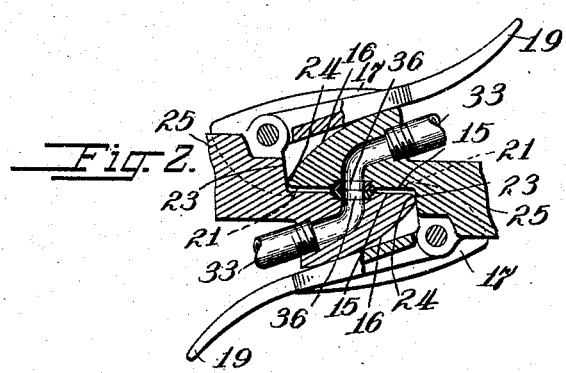

UNITED STATES PATENT OFFICE.

BOLESLAW R. KOZLOWSKI, OF CHICAGO, ILLINOIS.

TRAIN-PIPE COUPLING MEMBER.

No. 908,014.        Specification of Letters Patent.        Patented Dec. 29, 1908.

Application filed April 11, 1907, Serial No. 367,549. Renewed February 20, 1908. Serial No. 416,928.

*To all whom it may concern:*

Be it known that I, BOLESLAW R. KOZLOWSKI, a citizen of the United States, residing at Chicago, in the county of Cook and State of Illinois, have invented certain new and useful Improvements in Train-Pipe Coupling Members, of which the following is a specification.

This invention relates to certain new and useful improvements in train-pipe coupling members.

This invention aims to provide improved gathering devices for the alinement of one pipe coupling member with an opposing member.

The invention further aims to construct a pipe coupling member with an anti-friction element to facilitate rapid alinement of one coupling member with a complementary member.

A further object of the invention is the provision of a pipe coupling member construction whereby, when the members are in coupled engagement there will not be movement of one member relatively to the other member.

With these and other objects in view, the invention consists of the novel features and the combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters denote corresponding parts throughout the several views, and in which—

Figure 1 is a perspective view of a pipe coupling member mounted on the pipe coupling draw-bar. Fig. 2 is a sectional detail showing the central port in the coupling members coupled. Fig. 3 is a side elevation of a coupling member showing the front or left side of the member. Fig. 4 is a side elevation of a coupling member showing the back or right side of the member. Fig. 5 is a top plan view of two coupling members in the act of coupling.

One embodiment of my invention is described as follows:

Reference numeral 6 denotes a M. C. B. coupler head, and 7 the draw-bar of the car. 8 is a front hanger fastened to the substructure of the car, and 9 is a rear hanger which may be secured to the substructure of the car or to the draw-bar, 7, preferably the latter.

The numeral 10 represents a pipe coupling draw-bar with a depending arm, 11, on its forward end, and 12 indicates a spring element the rearward movement of which is prevented by bracket, 9. In front of spring 12 is the brace-bar, 13, which is connected with arm 11 at the bottom thereof.

The pipe coupling member, 14, is provided with a rear casing, 26, attached thereto or made integral therewith and open at both ends, substantially vertically disposed and adapted to partly embrace the defending arm, 11, for slidable movement thereon, and forward gathering devices.

Reference character 15 indicates the face of the pipe coupling member, 14, and 16 denotes the back of the member.

17, 17 represent the forwardly extending, diverging guide-blades on the back of each member.

18, 18 indicate forwardly disposed segmental extensions of the member 14 positioned at right angle to the longitudinal axis of the member. It will be observed said extensions are braced or strengthened by the blades 17, 17. The guide-arm, 19, is pivotally secured to the abutment, 23, in the ordinary manner, and the elastic blade, 20, is secured by bolt, 31, and the forward end of the blade 20 resists the outward movement of the arm, 19. At the front of the shank 25 is the abutment 23, and at the rear of the shank is the casing 26, which has an opening entirely through its greatest length, as shown in Fig. 3. The casing is provided with an anti-friction element, 27, at its upper front side. There is also a similar element, 27, at the lower rear side of the casing, as shown in Fig. 4. This element is constructed by making an aperture entirely through the wall of the casing at right angle with the opening therethrough and intersecting the opening. A round bar of suitable length is then inserted in the aperture and cotter pins, 28, put through each end of the round bar. As shown in Fig. 5, I have a roller bearing in front near the top and behind near the bottom of the casing.

I do not wish to limit myself to the particular construction of anti-friction element shown and described.

There is an apertured collar, 29, between the lower end of the casing and the arm 11. Pin 30 is through the lower end of arm 11 for the well-known purpose.

The description of one pipe coupling member applies also to the other coupling member, as they are duplicates of each other, and the description given is of each one.

The steam pipe, 32, is suitably connected to the rear of the member 14 at one side of the shank 25 in the steam passage which opens in the face, 15, as indicated at gasket 35. The air and signal hose, 33, are connected in a similar and common manner to the rear portion of the member 14, with passages opening in the face or front thereof. The gaskets, 35, 36 and 37 in the steam, signal and air ports in the face of member 14 preferably have relatively wide surfaces to contact with the respective gaskets of the opposing member. The rotatable bearings, 27, are positioned and adapted to contact one with the forward and one with the rearward surface of the arm 11 to obviate friction and to facilitate quick alinement of the coupling member with an opposing member. The forward edge, 24, of member 14 is limited in its rearward movement by abutment, 23 (shown in Figs. 1, 2 and 4). The rear surface of 14 is curved preferably, but an inclined rear surface will suffice. The face of 14 is preferably made straight. The forwardly inclined and outwardly curved locking projection, 21, is adapted to slidingly bear upon the upper or lower margin of the face of 14 until it advances to the heel of the opposite coupling member, when the locking projection will engage with heel 22.

For the purpose of preventing fore and aft movement or a rotative movement of one member 14 with reference to its complementary member, each end, 38, of the abutment 23 is constructed to afford a bearing surface for the part 39 of the opposing member. The forward portion of bearing 39 is preferably curved. The segmental extensions 18, 18 on members 14, 14 afford additional gathering means to compel vertical alinement of the members in coupling. The anti-friction element or roller bearing, 27, preferably consists of a cylindrical rod in an aperture intersecting the longitudinal opening in the casing 26, and at right angle with such opening. The roller is provided at each end with the common cotter pin to prevent its withdrawal from the aperture.

In operation the members, 14, 14 are brought into contact in the act of coupling. If the members are not in exact alinement the guide arm, 19, on each member will first engage with the inner surface of one or the other of the guide-blades, 17, 17, and compel alinement by adjusting or raising the opposite member to the same horizontal plane; and if in exact alinement, then the arm will contact with the back, 16, of the member between the guide blades and proceed to and between the rear or converging ends of the blades until the locking projections, 21, 21 have advanced sufficiently to drop behind or engage with the heels 22, 22, of the opposite member, when by a lateral movement relative to one another the gaskets, 35, 36, 37 in the faces of the members are brought into contact by the force of spring blades, 20, 20 bearing against the respective guide-arms 19, which exert a constant pressure and maintain the members in close contact to prevent the escape of steam or air between the opposed gaskets. The pipe coupling members will pull apart, in the act of uncoupling, without injury to the parts.

On reference to the construction and arrangement of the forwardly inclined and outwardly curved locking projections it will be apparent that the faces 15 of the members 14 will approach each other and recede from each other in the act of coupling and uncoupling when the locking projections, 21, 21 are forced behind engaging wheels, 22, 22, or are pulled from engagement therewith, and, therefore, no injury is done to the gaskets. It will be noticed the gaskets are not in the paths of the locking projections. Abutment 23 of the member 14 will limit the longitudinal movement of the forward end 24 of the opposing member, and the ends, 38, 38, of the abutment will ordinarily contact with the bearings, 39, 39, of the complementary member and obviate fore and aft or rotative movement of one member relatively to the other.

Variation in form, arrangement and constructions above described is possible, and I desire, therefore, not to limit my invention to such description of the preferred form in which it has been embodied.

The subject matter disclosed and not claimed in this application is disclosed and claimed in my concurrent application filed January 30, 1907, renewed February 20, 1908, and again renewed October 10, 1908, Serial Number 457,136.

Having thus fully described my invention, what I claim as new, and desire to secure by Letters-Patent, is—

1. A train pipe coupling member comprising a body portion having a fluid passage therethrough and carrying a casing rearwardly disposed in respect of the body portion and substantially at right angle therewith, the casing having an opening entirely through its greatest length, substantially as shown and described.

2. A train pipe coupling member comprising a body portion having a fluid passage therethrough and carrying a casing rearwardly disposed in respect of the body portion and substantially at right angle therewith, the casing having an opening entirely through its greatest length, and forwardly positioned segmental extensions at right angle to the longitudinal axis of the pipe coupling member, substantially as shown and described.

In testimony whereof I affix my signature in presence of two witnesses.

BOLESLAW R. KOZLOWSKI.

Witnesses:
S. ELVA KELLOGG,
ALICE MURRAY.